United States Patent [19]

Hirayama

[11] Patent Number: 5,002,237

[45] Date of Patent: Mar. 26, 1991

[54] REMOVABLE TAPE REEL ASSEMBLY SYSTEM FOR A MAGNETIC TAPE CASSETTE

[75] Inventor: Hiromichi Hirayama, Yokohama, Japan

[73] Assignee: Victor Company of Japan, Ltd., Yokohama, Japan

[21] Appl. No.: 442,203

[22] Filed: Nov. 28, 1989

[30] Foreign Application Priority Data

Nov. 28, 1988 [JP] Japan ................... 63-301395

[51] Int. Cl.⁵ ............... B65H 75/28; B65D 85/04; B65D 85/66
[52] U.S. Cl. .................... 242/74.1; 242/74; 206/53; 206/414
[58] Field of Search ........... 242/74.1; 206/53, 54, 206/55, 413, 415, 416, 398, 389, 399, 400, 402, 414

[56] References Cited

U.S. PATENT DOCUMENTS

| | | | |
|---|---|---|---|
| 1,602,470 | 8/1925 | White | 242/74.1 |
| 1,904,158 | 6/1930 | McGuire | 206/399 |
| 1,905,488 | 6/1930 | Nack | 206/399 |
| 2,838,167 | 6/1958 | Kulka | 206/54 |
| 3,287,777 | 7/1964 | Cranwill | 242/74.1 X |
| 3,600,762 | 8/1971 | Rissberger | 206/53 X |
| 4,504,027 | 3/1985 | Okamura et al. | 242/74.1 |
| 4,512,462 | 4/1985 | Dills | 206/53 |

FOREIGN PATENT DOCUMENTS

923344 3/1946 France ................... 242/74.1

Primary Examiner—William A. Cuchlinski, Jr.
Assistant Examiner—Joseph A. Rhoa
Attorney, Agent, or Firm—Fleit, Jacobson, Cohn, Price, Holman & Stern

[57] ABSTRACT

A removable tape reel assembly system for a magnetic tape cassette includes a tape cassette (20) having a top section (22) and a bottom section (23) connected by a hinge (21), a movable supply reel (30) having a first hub (31) onto which a tape is wound and provided with flanges (32, 33) having first engaging portions (35) on the outer periphery, a take up reel (70) rotatably mounted to the bottom section (23) and having a second hub (71) forming a second engaging portion (74, 75), an anchor (40) having a body portion (41) and a fastener portion (42, 42a). One distal end of a tape is fixed to the first hub, and the other distal end is attached to the body portion of the anchor, so that disengaging of the tape is prevented when the fastener portion of the anchor engages with the first engaging portion of a flange of the removable supply reel, and the fastener portion is alternatively engageable with the second engaging portion of the hub of the take up reel so that the other distal end of the tape is connectable to the take up reel.

11 Claims, 16 Drawing Sheets

REMOVABLE TAPE REEL ASSEMBLY SYSTEM FOR A MAGNETIC TAPE CASSETTE

BACKGROUND OF THE INVENTION

This invention relates to a tape reel assembly having, or to have, a length of magnetic tape wound thereon. More specifically, the invention pertains to such a tape reel asssembly which lends itself to use as a removable supply reel of a magnetic video tape cassette in which a takeup reel assembly is permanently mounted for reel-to-reel tape transportation.

Video tape recorders (VTRs) for use with magnetic tape packaged in cassette form have won extensive commercial acceptance. The magnetic video tape cassette houses a supply reel and a takeup reel with a length of magnetic tape having its opposite extremities anchored to both reels. The cassette can be slipped into the VTR for recording or reproduction without threading the tape. Thus the cassette contributes to the ease of handling of the tape and to its protection against destruction when the tape is not in use.

There has been an inconvenience, however, arising from the fact that the video tape cassette of standard design is not so compact in size as can be desired. The cassettes demand a large storage space when their stock increases. It has been no easy task, either, to carry the cassettes from one location to another.

In an attempt to overcome these inconveniences, Japanese Unexamined Patent application No. 62-184677 suggests a magnetic tape cassette having a reel assembly that is readily removable from within the cassette housing together with the tape wound thereon. The supply reel assembly has a reel housing in which a tape reel is rotatably enclosed. The tape reel is mounted in, and dismounted from, the tape cassette together with the reel housing. The removable supply reel assembly has a far less storage space requirement, and is easier to handle, than the cassette itself.

An objection to this known solution is that the removable supply reel is enclosed in its own reel housing. The space requirement of the supply reel would, of course, be appreciably less if it had no housing. Another objection is that the outer end of the tape is not positively retained against the loosening of the tape. The tape end has therefore been easily loosened within the reel housing if the tape reel is revolved within the reel housing as by a finger inserted to the reel hub position. When the supply reel assembly is mounted within the cassette, too, difficulties have been encountered in manipulating the tape for threading and anchoring it to a take up reel hub.

SUMMARY OF THE INVENTION

The present invention provides an improved tape reel assembly which may be used as a removable supply reel of a magnetic tape cassette without the noted drawbacks of the prior art.

Stated in its perhaps simplest form, the improved tape reel assembly of the invention comprises a reel hub to which a length of magnetic tape is to be anchored at one end and around which the tape is to be coiled, and a pair of reel flanges formed on the opposite ends of the reel hub. Also included is a tape anchor engageable with the reel hub and with at least one of the reel flanges for anchoring the one end of the tape to the reel hub and retaining another end of the tape coiled around the reel hub.

When the tape reel assembly is not in use, the outer end of the tape wound around the reel hub can be positively locked against loosening by the tape anchor engaged with one of the reel flanges. The tape can therefore be safely kept in storage.

Typically, the tape anchor comprises a body portion for retaining another end of the tape between the reel flanges of the pair, and a fastener portion joined to the body portion for engagement with one of the reel flanges. Preferably, a series of notches are formed in the periphery of the reel flange at constant circumferential spacings. The fastener portion can be readily engaged in, and disengaged from, any selected one of the notches.

An additional advantage of the invention manifests itself when the tape reel assembly is used as a removable supply reel of a tape cassette. In this application the tape anchor serves the additional purpose of readily and firmly anchoring the tape end to the takeup reel of the tape cassette. No other means are required for this tape anchorage. Still further, unwound from the removable supply reel assembly, the tape with the tape anchor thereon can be easily threaded through the tape guide means of the tape cassette before being anchored to the takeup reel. It is even unnecessary to disengage the tape anchor from the supply reel assembly before the same is mounted in the tape cassette.

The above and other features and advantages of this invention and the manner of realizing them will become more apparent, and the invention itself will best be understood, from a study of the following description and appended claims, with reference to the accompanying drawings showing the preferred embodiments of the invention.

DESCRIPTION OF THE PREFERRED EMBODIMENTS

General

Figure 1:
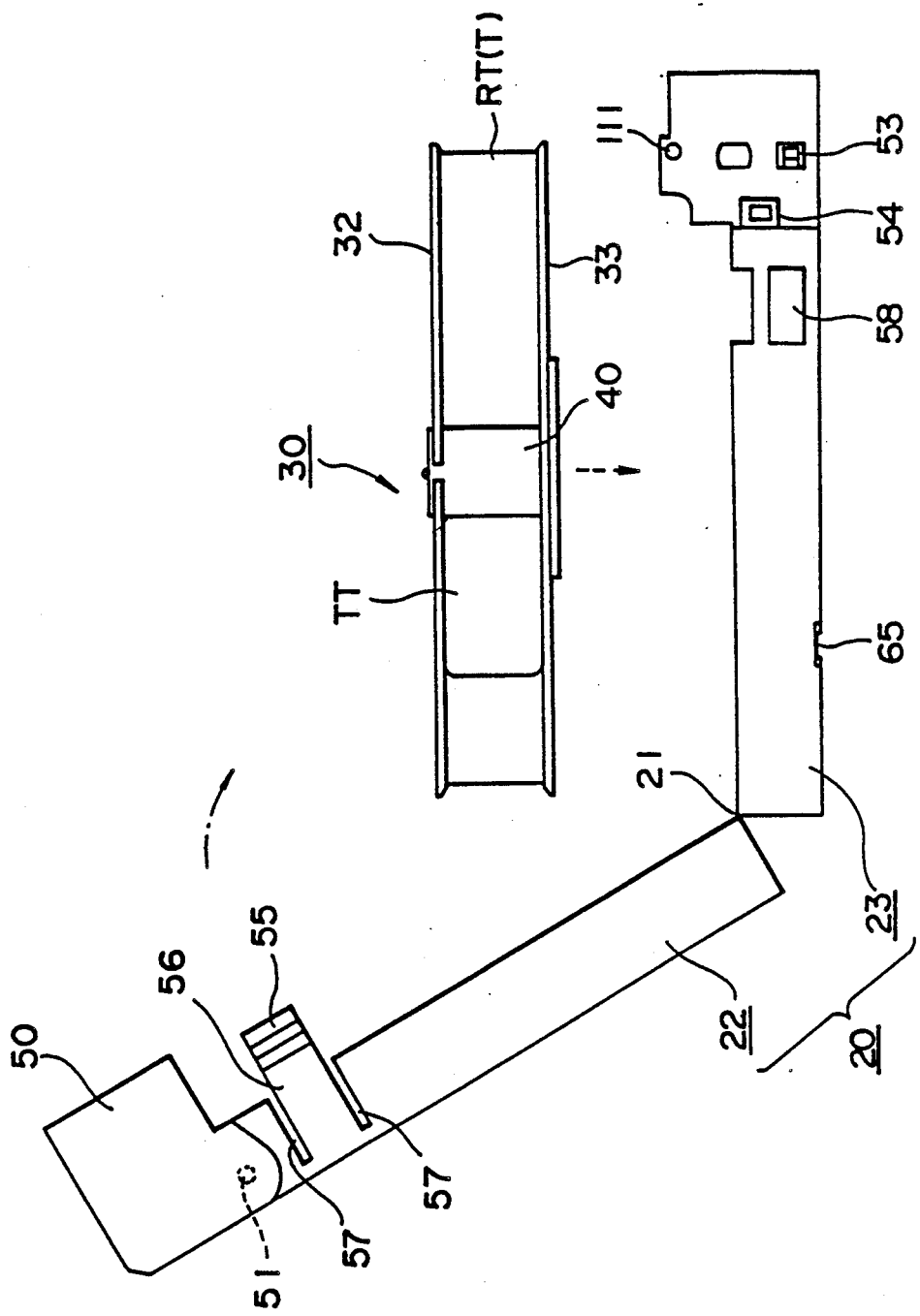
FIG. 1 is an elevational view of a magnetic video tape cassette which is shown opened and with a supply reel assembly removed therefrom, the removable supply reel assembly representing an embodiment of the present invention.

The present invention will now be described more specifically as adapted for use with a magnetic tape cassette for VTRs. FIG. 1 shows a magnetic tape cassette assembly 20 together with a removable supply reel assembly 30 forming the gist of the invention. The tape cassette assembly 20 and the supply reel assembly 30 constitute in combination a magnetic tape cassette that can be put to use with VTRs of standard construction. The supply reel assembly 30 includes, or is provided with, a tape anchor 40 capable of locking engagement therewith for preventing the magnetic tape T from loosening while the supply reel assembly is not loaded in the tape cassette assembly 20.

Figure 2:
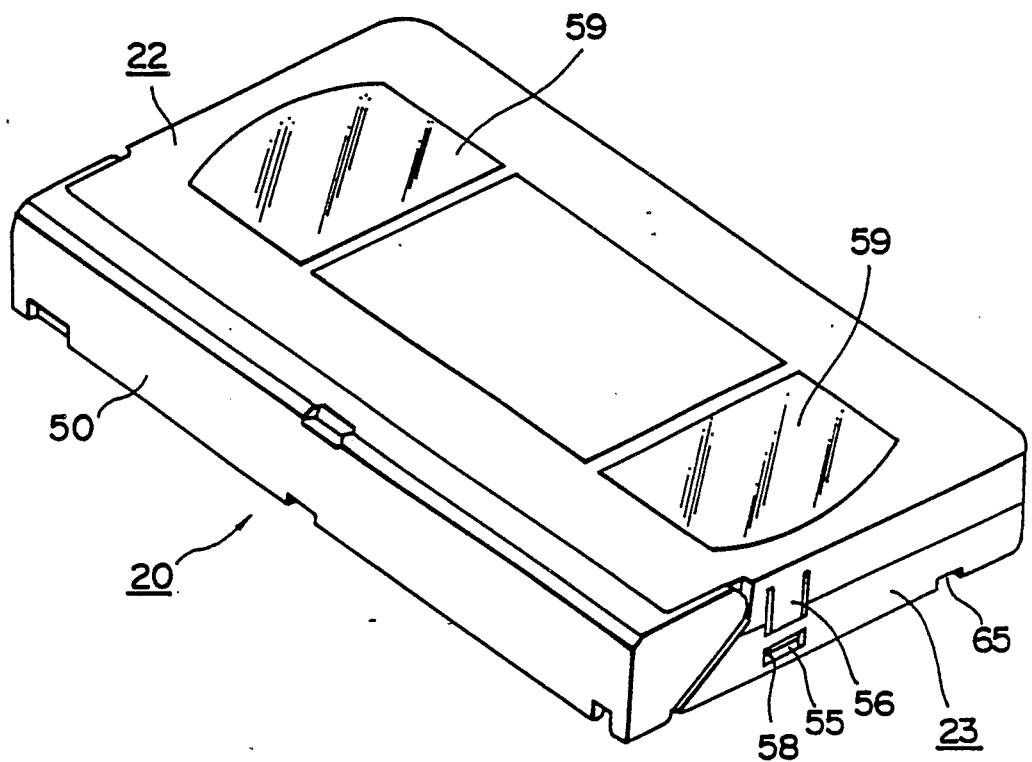
FIG. 2 is a perspective view of the tape cassette of FIG. 1 shown closed and as seen from above.
Figure 3:
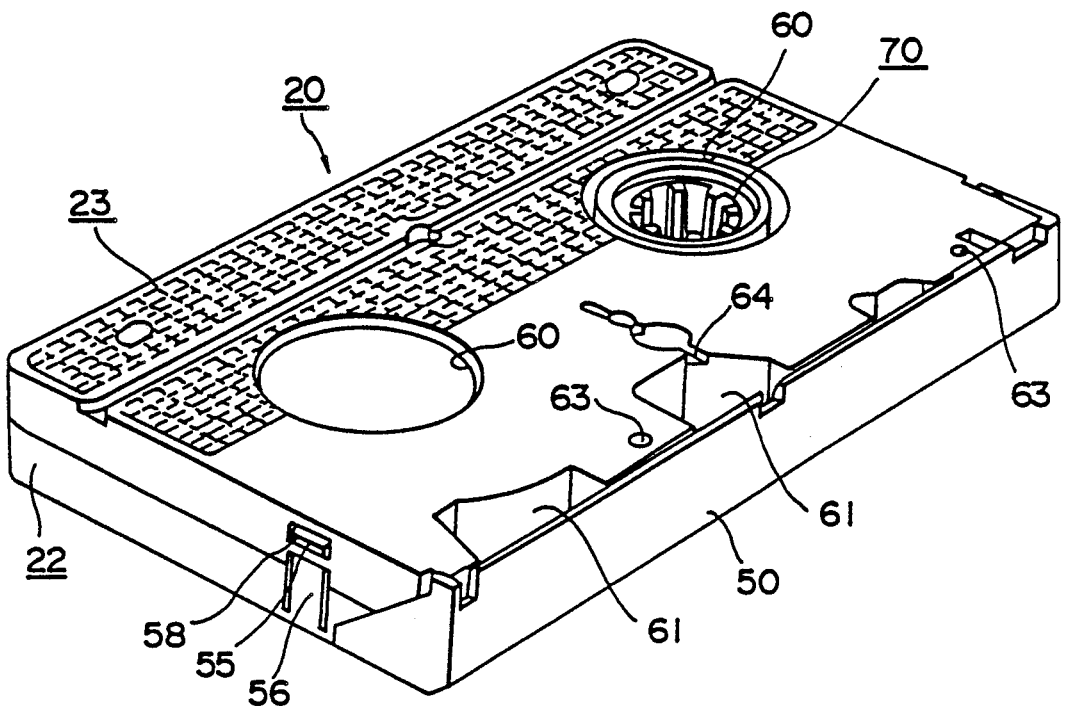
FIG. 3 is a perspective view of the tape cassette of FIG. 1, also shown closed but as seen from below.

FIG. 1 also clearly indicates that the cassette assembly 20 comprises two sections 22 and 23, both of generally rectangular shape, hingedly joined together at 21 along one of the longitudinal edges of each section. When the cassette sections 22 and 23 are closed against each other as depicted in FIGS. 2 and 3, with the reel assembly 30 mounted therein, there is formed the magnetic tape cassette of the same shape, size and appearance as the standard tape cassette having the unremovable reels.

The section 22 of the cassette assembly 20 will be hereinafter referred to as the top section, and the other section 23 as the bottom section, in reference to the intended correct placement of the tape cassette pictured in FIG. 2. The tape cassette may therefore be considered to be placed upside down in FIG. 3.

Figure 4:
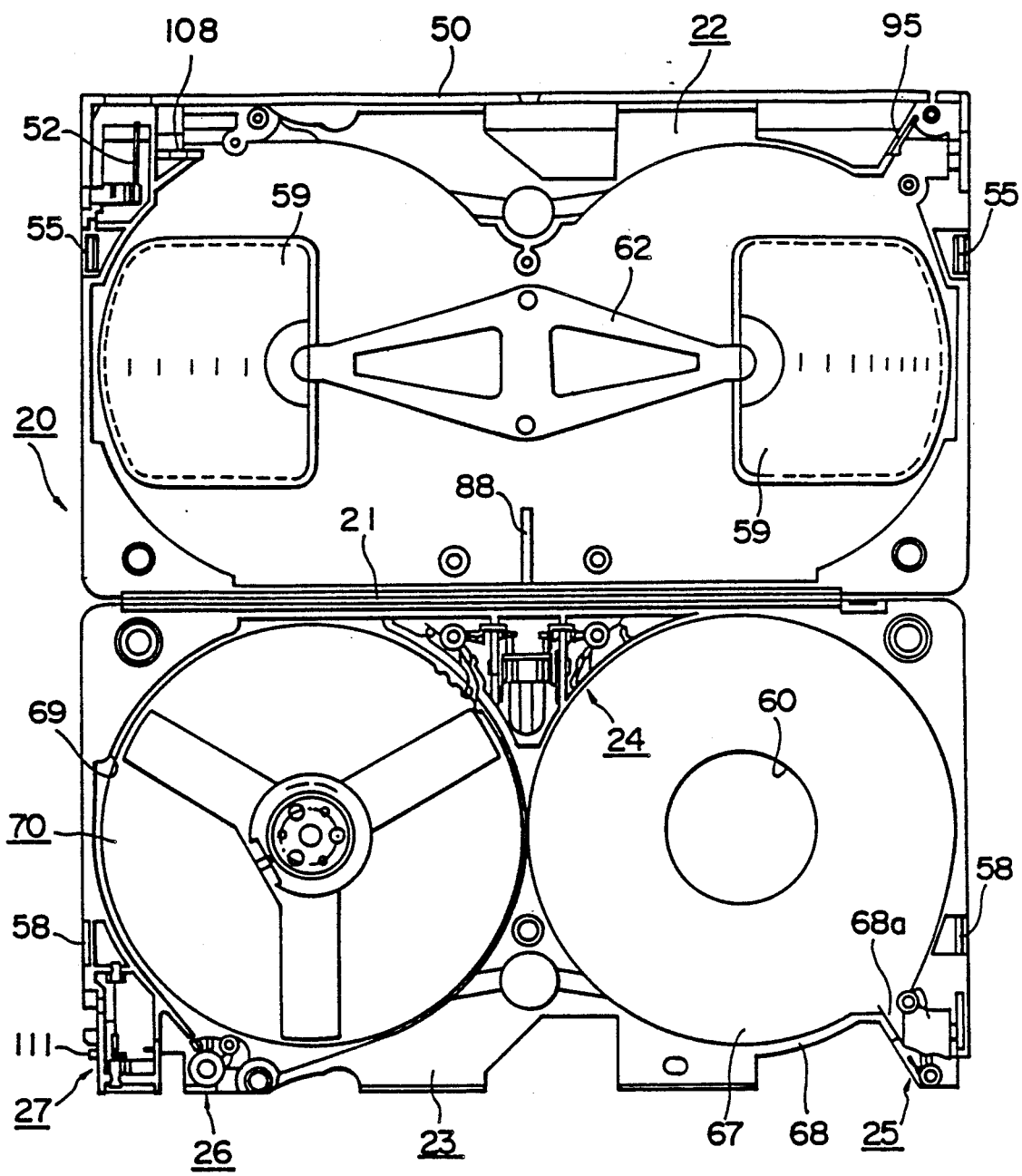
FIG. 4 is a top plan view of the tape cassette shown fully open to reveal its inner details, the view not showing the removable supply reel assembly.

FIG. 4 reveals the inside of the cassette assembly 20 with its two sections 22 and 23 shown fully open. The cassette assembly 20 has a takeup reel assembly 70 permanently mounted therein. Also mounted within the cassette assembly 20 are a reel-locking mechanism 24 for locking and unlocking the supply reel assembly 30 and takeup reel assembly 70, a pair of tape guide mechanisms 25 and 26 for guiding the magnetic tape from one reel assembly to the other, and a front-cover retractor mechanism 27 for preventing a front cover 50, pivoted on the top cassette section 22, from ruining the magnetic tape when the top cassette section is closed against the bottom cassette section 23.

The following is a more detailed discussion, under separate headings, of the supply reel assembly 30 and the listed constituent mechanisms of the tape cassette assembly 20 related to the supply reel assembly.

Supply Reel Assembly

Figure 5:
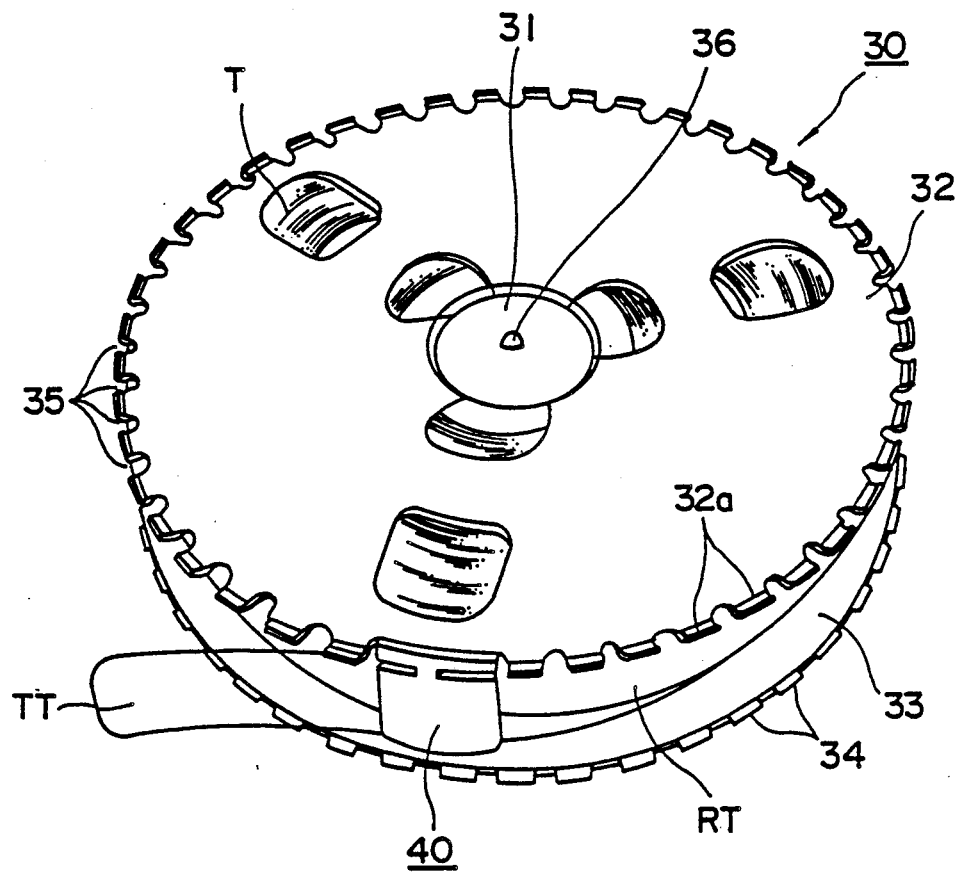
FIG. 5 is an enlarged perspective view of the removable supply reel assembly.
Figure 6:
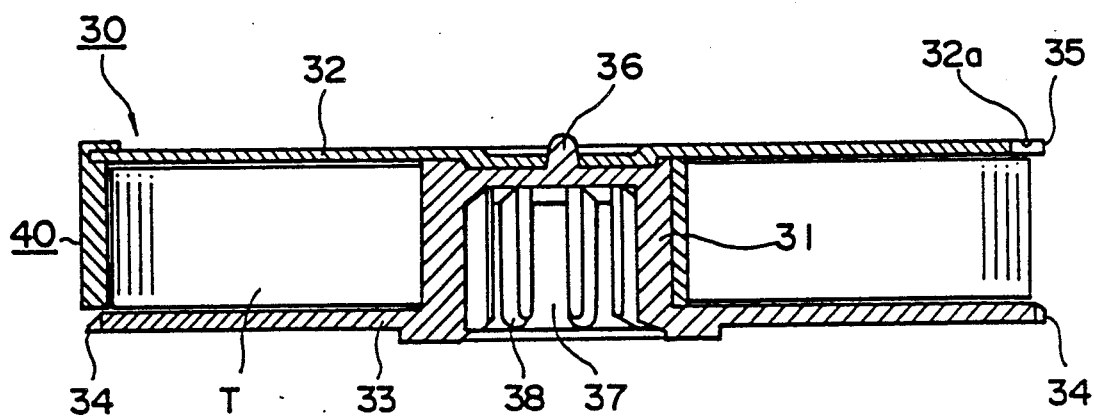
FIG. 6 is an axial cross-sectional view through the removable supply reel assembly of FIG. 5.

With reference to FIGS. 5 and 6 the supply reel assembly 30 comprises a hub 31 to which the magnetic tape T is anchored at one end and around which it is wound at least in part, and a pair of flanges 32 and 33 on the opposite ends of the hub. The flange 32 may be called the top flange, and the other flange 33 the bottom flange, in conformity with the nomenclature of the top and bottom sections 22 and 23 of the tape cassette assembly 20.

As will be understood from FIG. 6, the bottom flange 33 is formed in one piece with the reel hub 31. The top flange 32, however, is a separate member rigidly joined to the reel hub. At least the top flange 32 should be fabricated from a transparent material. When the reel assembly 30 is mounted in position within the cassette assembly 20, the transparent top flange 32 makes the tape T, coiled around the reel hub 31, visible through one of the pair of windows 50, FIG. 2, in the top cassette section 22. The other window 59 is of course intended to enable the user to see the tape wound on the takeup reel assembly permanently mounted within the cassette assembly 20, as will be later described in more detail.

The bottom reel flange 33 has series of radial teeth 34 formed on its periphery. The top reel flange 32 has a series of notches or indentations 35 formed in its periphery for engagement with a tape anchor or tape-end retainer 40 yet to be referred to.

Hollow as shown in FIG. 6, the reel hub 31 is closed at its top end only. A boss 36 is formed centrally on this closed end of the reel hub 31. When the reel assembly 30 is loaded in position within the cassette assembly 20, the boss 36 is to be pressed down by a cantilevered reel-retainer spring 62, FIG. 4, which is mounted in the top cassette section 22. The open bottom of the reel hub 31 is intended for the insertion of the one of the pair of drive spindles of the associated VTR. The inside surface of the reel hub 31 is ribbed at 38 for positive driven engagement with the drive spindle.

Tape Anchor

Figure 7:
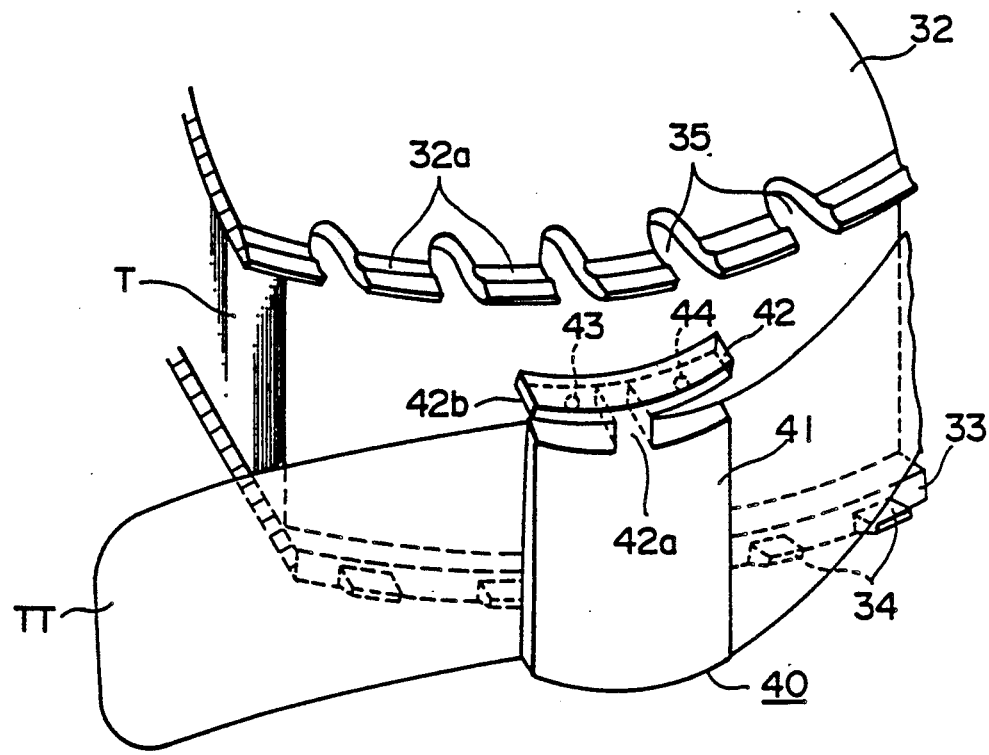
FIG. 7 is a still more enlarged, fragmentary perspective view of the removable supply reel assembly, showing in particular the details of the tape anchor included in the reel assembly.

As illustrated in FIGS. 5 and 6 and on an enlarged scale in FIG. 7, the tape anchor 40 is provided to hold a tape leader RT forming an extension of the magnetic tape T. Releasably engaged with the notched periphery of the top reel flange 32 when the reel assembly 30 is not in use, the tape anchor 40 serves to prevent the tape T from loosening or unwinding. If desired, the leader RT may be attached to the tape anchor 40 by some means such as removable glue or double stick tape of removable nature.

FIG. 7 best indicates that the tape anchor 40 is a one-piece construction of a generally flat, rectangular body portion 41 and a T-shaped fastener portion 42. The body portion 41 is sized to fit between the pair of reel flanges 32 and 33. The fastener portion 42 has a neck 42a and a head 42b. The neck 42a is sized to fit in any of the notches 35 in the top reel flange 32, with the result that the top reel flange is relatively closely caught between the body portion 41 and the head 42b of the fastener portion 42.

FIG. 7 also indicates by the dashed lines a pair of small, round protuberances 43 and 44 formed on the underside of the head 42b of the fastener portion 42 and on the opposite sides of the neck 42a. These protuberances 43 and 44 are intended for sliding engagement into and out of grooves 32a which are formed in the upper or outer surface of the top reel flange 32 and which extend all along its notched periphery.

Thus, as the neck 42a is pressed into one of the notches 35 in the top reel flange 32, the tape anchor 40 will click into position on the reel assembly 30. The leading end of the tape T can then be positively retained between the top and bottom flanges 32 and 33 and against its coil formed around the reel hub 31. It will be appreciated that the tape anchor 40 can be engaged with top reel flange 32 in any angular position thereon because the notches 35 and grooves 32a are formed along its complete periphery.

The tape anchor 40 retains the tape leader RT by pressing the same against the coil of tape T. However, the tape anchor 40 should not exert any localized pressure on the tape coil to such an extent as to deform or otherwise ruin the tape. It is therefore recommended that the inside surface of the body portion 41 of the tape anchor 40 be curved with approximately the same radius as the periphery of the tape coil (see FIG. 20). Of course, the tape anchor will be spaced from the tape coil and so will exert no pressure thereon if the tape is not fully wound to fill the reel assembly 30.

Figure 9:
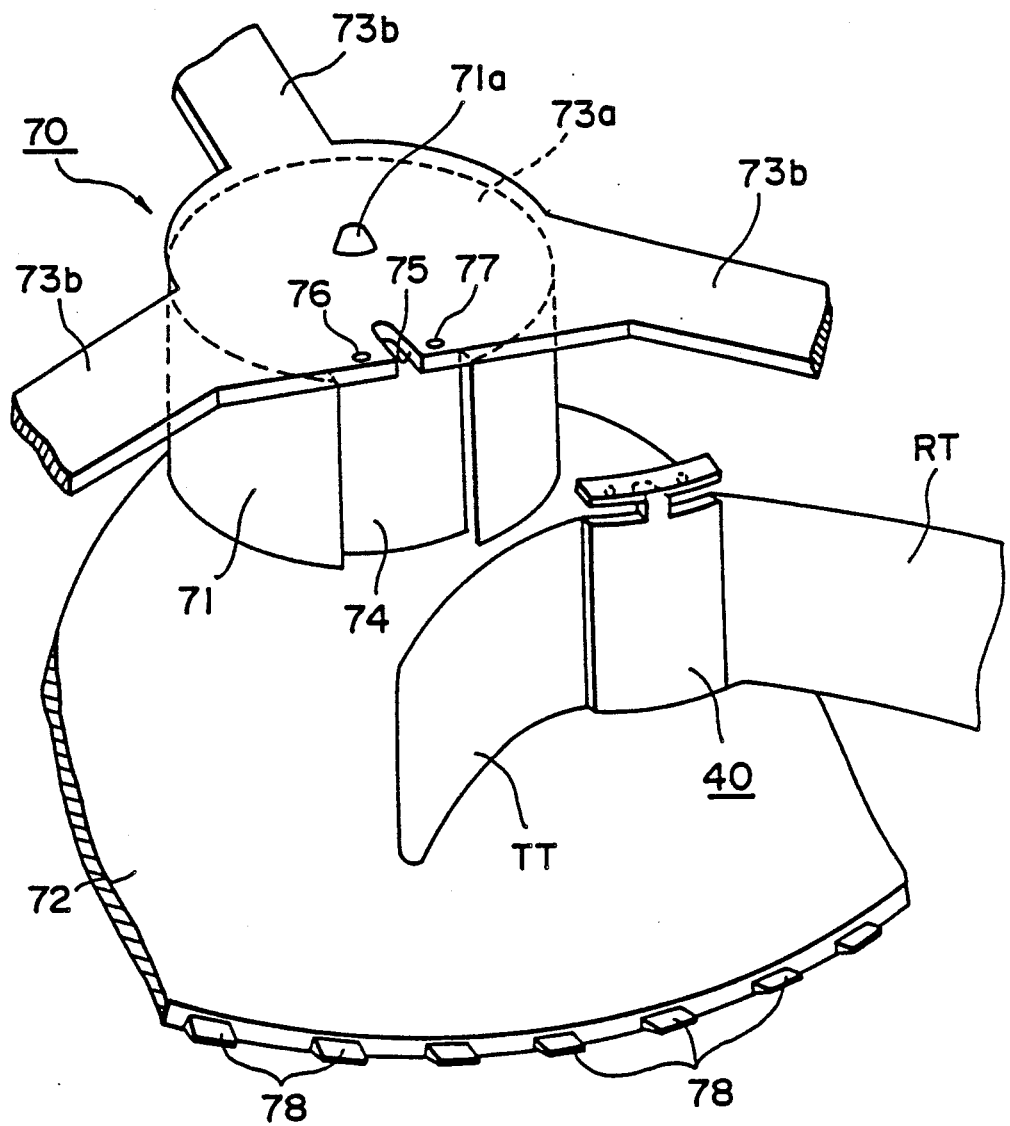
FIG. 9 is a fragmentary perspective view showing the tape anchor of FIG. 7 together with the takeup reel assembly of the tape cassette.

The tape anchor 40 functions not only to hold the tape end in place on the supply reel assembly 30 but also to anchor the tape to the takeup reel assembly 70 shown fragmentarily in FIG. 9. In this latter use the tape anchor 40 is to engage the tape end against the hub 71 of the takeup reel assembly 70. So anchored to the takeup reel hub 71, the tape T can be securely fastened thereto. In consideration of this additional use of the tape anchor 40, its body portion 41 has its outer surface curved with approximately the same radius as the takeup reel hub 71. The magnetic tape T can thus be coiled around the takeup reel hub 71 without creating radial irregularities or without being ruined by the tape anchor 40. In this regard, construction of the takeup reel assembly 70 may be identical to the one of the supply reel assembly 30, so that both reels are common in type to each other.

With reference back to FIGS. 5-7 a part of the tape leader RT which extends beyond the tape anchor 40 forms a tag TT to be pulled manually for disengaging the tape anchor 40 from the top reel flange 32. FIGS. 5 and 7 show that the tape tag TT is semipermanently curled outwardly of the coil of tape T, extending away from between the pair of flanges 32 and 33 of the reel assembly 30 even when the tape anchor 40 is in locking engagement with the top reel flange 32. The tape tag TT may therefore be readily caught by fingertips for disengaging the tape anchor 40 from the top reel flange 32.

Alternate Tape Anchor

Figure 8:
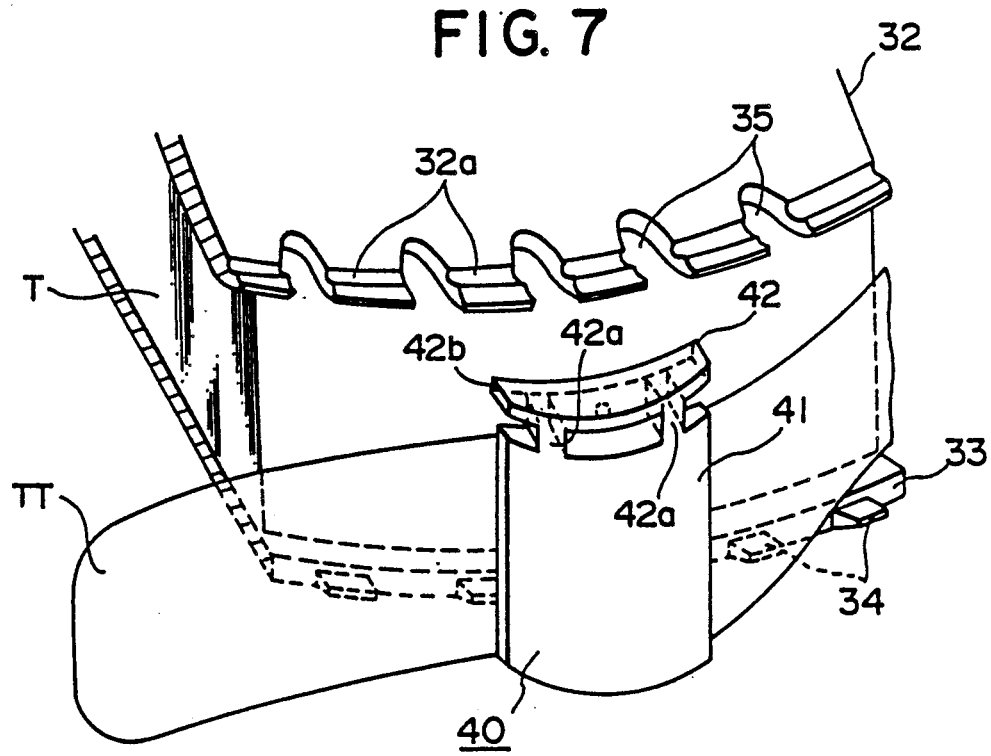
FIG. 8 is a view similar to FIG. 7 but showing an alternative form of tape anchor according to the invention.

The tape anchor 40 may alternatively be constructed as shown at 40 in FIG. 8. The fastener portion 42 of this alternate tape anchor has two necks 42a instead of the single neck of the first disclosed tape anchor. Joining the body portion 41 to the head 42b, the two necks 42a are spaced from each other a distance equal to the spacing between the notches 35 in the top reel flange 32. The other details of construction can be as previously set forth with reference to FIGS. 1 and 5-7.

The two necks 42a of the FIG. 8 tape anchor 40 may be engaged in any two neighboring notches 35 in the top reel flange 32. The head 42b can be engaged in the grooves 32a as in the first disclosed embodiment.

The FIG. 8 tape anchor 40 with its two necks 42a gains the advantage of more positive engagement with the top reel flange 32. It is also improved in its own mechanical strength and, therefore, in durability.

It will be understood in connection with the two forms of tape anchors disclosed above that the notches 35 and grooves 32a need not be formed all along the periphery of the top reel flange 32. The purposes of the invention can be achieved if the notches and grooves are formed only in or along part of either of the two flanges 32 and 33 of the reel assembly 30.

General Construction of Magnetic Tape Cassette Assembly

The magnetic tape cassette assembly 20 is constituted as aforesaid of the top section 22 and the bottom section 23, as illustrated in FIGS. 1-4. The top cassette section 22 has the front cover 50 pivotally mounted on its front end, away from its hinged rear end, by a pair of trunnions 51 (one seen in FIG. 1). The front cover 50 is to be automatically opened when the tape cassette assembly 20, together with the supply reel assembly 30 mounted therein, is loaded in a video tape recorder (VTR), exposing the magnetic tape T extending along a predefined path within the cassette housing. A spring 52, FIG. 4, normally holds the front cover 50 closed.

FIG. 1 shows a cover-locking member 53 and a cover-unlocking member 54 disposed on one of the side walls of the bottom cassette section 23 in the vicinity of its front end. The cover-locking member 53 functions to normally hold the front cover 50 locked in the closed position as shown in FIGS. 2 and 3. The cover-unlocking member 54 functions to unlock the front cover 50 by acting on the locking member 53 when the cassette assembly 20 is loaded in the VTR.

The cassette assembly 20 is further provided with means for releasably locking together its top and bottom sections 22 and 23 in the closed positions of FIGS. 2 and 3. Such locking means include a pair of latches 56, seen in all of FIGS. 1-4, depending from the pair of side walls of the top cassette section 22 and each terminating in a hook 55 projecting laterally. Formed on both sides of each latch 56, a pair of slits 57 permits elastic deformation of the latch in a direction normal to the plane of the cassette wall from which it depends. The bottom cassette section 23 has a pair of slot-like apertures 58 for receiving the hooks 55 of the latches 56. Consequently, when closed against each other, the two cassette sections 22 and 23 become positively latched together as the hooks 55 of the latches 56 enter the apertures 58 from within the cassette housing.

Seen at 60 in FIG. 3 are a pair of openings in the bottom cassette section 23 for the insertion of the pair of reel drive spindles of the VTR. The bottom cassette section 23 also has apertures 61 for the insertion of the tape-loading members of the VTR. Holes 63 are intended for the determination of the vertical position of the cassette assembly 20 within the VTR. Grooves 64 and 65, FIGS. 1–3, function to prevent the cassette assembly 20 from being loaded in the VTR in the wrong direction. A hole 66 is to receive a rod 85, FIG. 12, of the VTR when the cassette assembly 20 is loaded therein.

Within the cassette assembly 20, as revealed by FIG. 4, there are defined a supply reel chamber 67 for accommodating the removable supply reel assembly 30 and a takeup reel chamber 69 having a takeup reel assembly 70 permanently mounted therein. The supply reel chamber 67 is bounded by a circular wall 68 having a diameter slightly more than that of the supply reel assembly.

Takeup Reel Assembly

As drawn fragmentarily in FIG. 9, the takeup reel assembly 70 comprises a hub 71, a bottom flange 72 and a top flange 73 on the opposite axial ends of the reel hub. The reel hub 71 has formed therein a recess 74 in which is to be engaged the tape anchor 40 for anchoring one end of the magnetic tape T unwound from the supply reel assembly 30.

The bottom flange 72 is disklike in shape, having formed on its periphery a series of radial teeth 78 similar to the teeth 34, FIG. 5, on the bottom flange 33 of the supply reel assembly 30.

The top flange 73 comprises a disklike flange hub 73a held fast against the reel hub 71 and a plurality of, three in this embodiment, spokes 73b extending radially from the flange hub at constant angular spacings. The flange hub 73a has a peripheral notch 75 positioned above the recess 74 in the reel hub 71 and between two spokes 73b. As the tape anchor 40 is pressed into the recess 74 in the reel hub 71, the neck 42a of the tape anchor is engaged in the notch 75 in the flange hub 73a.

The spoke construction of the top flange 73 is intended to facilitate the engagement of the tape anchor 40 in recess 74 in the reel hub 71. The tape anchor can be manipulated by the fingers inserted in and through the spaces between the flange spokes 73b. It will also be appreciated that the tape anchor 40 can be readily engaged in the recess 74 as its neck 42a is slid along the periphery of the flange hub 73a into engagement in the notch 75.

The flange hub 73a has also formed therein a pair of depressions 76 and 77 disposed on the opposite sides of the notch 75. Therefore, as the neck 42a becomes engaged in the notch 75, the pair of protuberances 43 and 44, FIG. 7, on the underside of the anchor head 42b become received in the depressions 76 and 77. The tape end can thus be firmly anchored to the takeup reel hub 71 by being pinched between the reel hub 71 and the body portion 41 of the tape anchor 40 in the recess 74.

So anchored to the takeup reel hub 71, the magnetic tape T is to be wound thereon in a counterclockwise direction as viewed in FIG. 9, that is, by revolving the takeup reel assembly 70 in a clockwise direction. It has been stated in connection with FIGS. 5 and 7 that the tape tag TT, extending beyond the tape anchor 40, is semipermanently curled outwardly of the supply reel assembly 30 when the tape anchor is in locking engagement with its top flange. Consequently, as the magnetic tape T is coiled in the noted direction on the takeup reel assembly 70, the tape tag TT becomes folded back over the tape anchor 40 and the initial turn of the magnetic tape around the reel hub 71. It will therefore be understood that the desired curling of the tape tag TT is reintensified each time the tape T is coiled on the takeup reel assembly 70 in use of the tape cassette.

The takeup reel assembly 70 has a boss 71a on the flange hub 73a for abutting engagement with the reel-retainer spring 62, FIG. 4, which has been mentioned in conjunction with the supply reel assembly 30. Preferably, for the longer useful life of the tape cassette, the bosses on the reel assemblies should be fabricated from such wear-resisting substances as synthetic sapphire or ruby or stainless steel.

Figure 11:
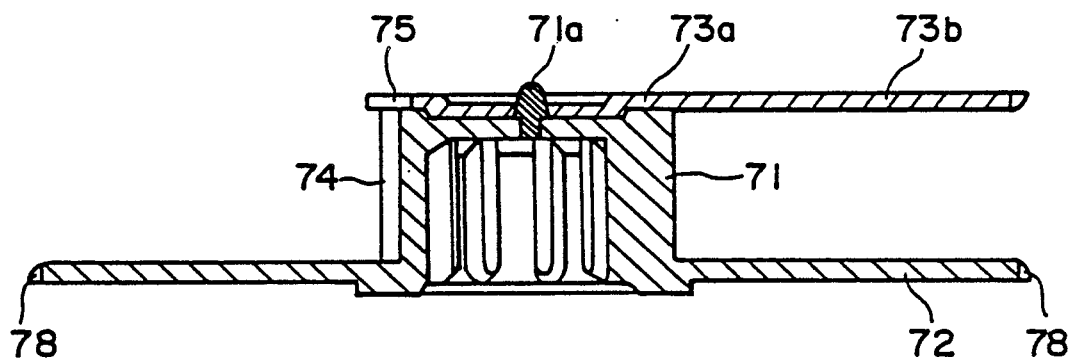
FIG. 11 is an axial cross-sectional view through an alternative form of takeup reel assembly.

The boss 71a need not be formed integral with the flange hub 73a or with the reel hub 71 if it is to be made of synthetic sapphire or like expensive material. Instead, as illustrated in FIG. 11, the boss may be formed separately and embedded in, or otherwise affixed to, the flange hub 73a or the reel hub 71.

Reel Locking Mechanism

Figure 12:
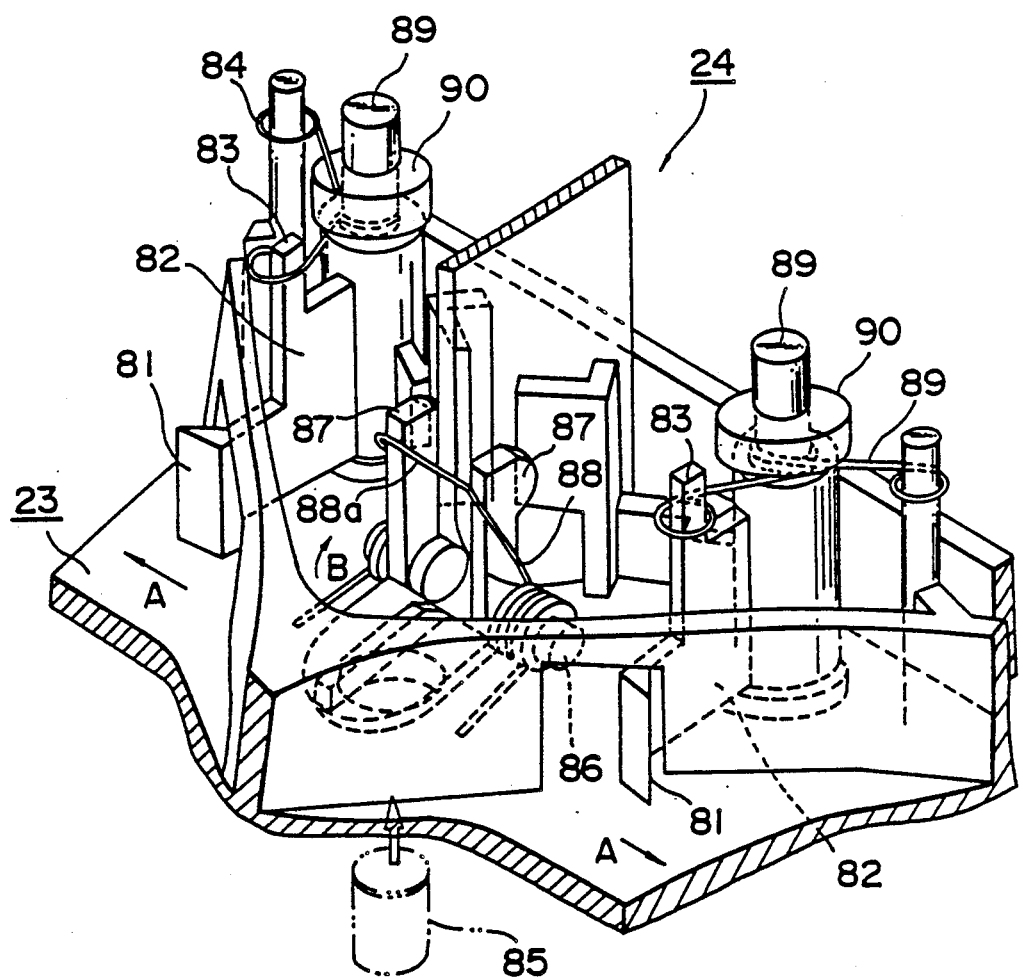
FIG. 12 is a perspective view of the reel-locking mechanism included in the tape cassette.

FIG. 12 illustrates in detail the reel-locking mechanism 24 provided within the cassette assembly 20. The reel-locking mechanism 24 functions to lock the supply reel assembly 30 and takeup reel assembly 70 against rotation when the cassette assembly 20 is not loaded in the VTR and when its constituent sections 22 and 23 are closed against each other. When the cassette assembly 20 is opened, the reel-locking mechanism 24 automatically unlocks the reel assemblies 30 and 70.

The various parts of the reel-locking mechanism 24 seen in FIG. 12 are all mounted in the bottom cassette section 23. The reel-locking mechanism 24 includes, first of all, a pair of reel detents 82 which are each substantially L shaped as seen from above. Each medially pivoted on a pivot pin 89 extending parallel to the reel axes, the reel detents 82 have angled tips 81 for locking engagement with the teeth 34 and 78 on the bottom flanges 33 and 72 of the supply reel assembly 30 or takeup reel assembly 70, respectively. Each reel detent 82 has a spring retainer 83 engaged by a torsion spring 84. Thus the reel detents are sprung in the directions of the arrows A for locking engagement with the respective reel flanges 33 and 72. Flanges or collars 90, formed one on each pivot pin 89, serve to prevent the accidental detachment of the reel detents 82 and torsion springs 84 from the pivot pins.

Those ends of the reel detents 82 which are away from the angled tips 81 are held opposite a pair of tripping levers 87 on a common pivot pin 86. Another torsion spring 88, generally U shaped and stronger than the first recited torsion springs 84, acts on both tripping levers 87 for biasing the same in the direction of the arrow B, such that the reel detents 82 are thereby urged out of locking engagement with the reel flanges 33 and 72. The second mentioned spring 88 will hereinafter be referred to as the tripping spring, and the first mentioned springs 84 as detent springs, by way of contradistinction from each other. When the tape cassette is loaded in the VTR, the tripping levers 87 are to be turned directly by an actuating pin 85 of the VTR for causing the reel detents 82 to unlock the reels against the forces of the detent springs 84.

The reel-locking mechanism 24 further includes an abutment 80 mounted fast within the top cassette section 22. The abutment 80 is to be abutted upon by the bight portion 88a of the U-shaped tripping spring 88 when the cassette assembly 20 is closed.

Figure 13A:
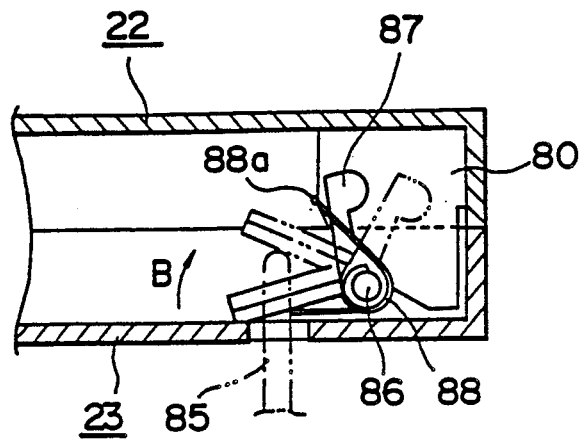
FIGS. 13A and 13B are fragmentary elevational views partly in section, explanatory of the operation of the reel-locking mechanism of FIG. 12.

In FIG. 13A is shown the reel-locking mechanism 24 in the state when the sections 22 and 23 of the cassette assembly 20 are closed against each other. It will be seen that the tripping spring 88 butts on the abutment 80 on the top cassette section 22 and thus is turned in a direction opposite to the direction B. If then the cassette is not loaded in the VTR, the pair of tripping levers 87 will not act on the reel detents 82, as indicated by the solid lines. Consequently, the reel detents 82 will move into locking engagement with the bottom reel flanges 33 and 72 under the influence of the detent springs 84.

Upon loading of the cassette assembly 20 in the VTR, the actuating pin 85 of the VTR will relatively act directly on the tripping levers 87, causing the same to turn clockwise, as viewed in FIG. 13A, about their common pivot 86. Thus turned from the solid-line to the phantom position in FIG. 13A, even though the tripping spring 88 is held in the illustrated position by the abutment 80, the tripping levers 87 will act on the reel detents 82 to cause the same to move out of locking engagement with the bottom reel flanges 33 and 72 against the forces of the detent springs 84.

Figure 13B:
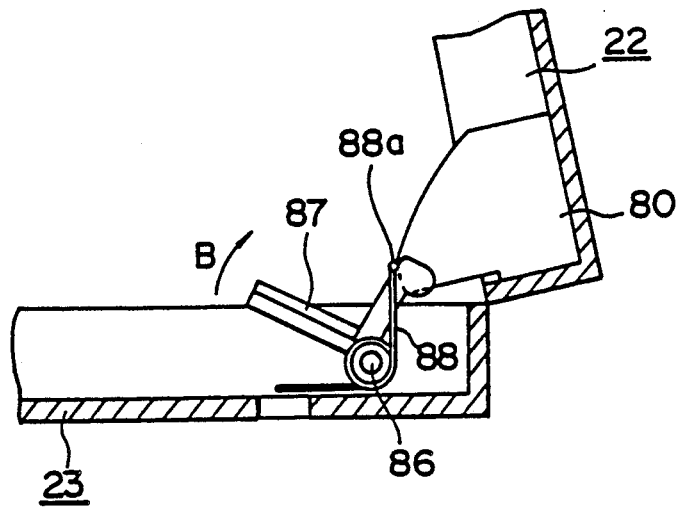

FIG. 13B shows the cassette sections 22 and 23 opened, as for mounting or dismounting the supply reel assembly 30 in or from the cassette assembly 20. No longer restrained by the abutment 80, the tripping spring 88 will turn the tripping levers 87 in the direction of the arrow B. Since the force of the tripping spring 88 is greater than the resultant of the forces of the detent springs 84, the reel detents 82 will then unlock the bottom reel flanges 33 and 72.

Thus both supply reel assembly 30 and takeup reel assembly 70 become free to rotate when the cassette assembly 20 is opened. Such free rotation of the reel assemblies is intended to facilitate the loading and unloading of the supply reel assembly 30 in and from the cassette assembly 20, as well as the manipulation of the tape anchor 40 into and out of engagement with the takeup reel assembly 70. Moreover, both reel assemblies 30 and 70 become locked against rotation when the cassette assembly 20 is closed, thereby preventing the tape from loosening when the cassette is not in use. Furthermore, when the closed cassette assembly is loaded in the VTR, the reel assemblies 30 and 70 become unlocked for the immediate commencement of recording or reproduction.

Supply-Side Tape Guide Mechanism

As will be understood by referring again to FIG. 4, there are provided one tape guide mechanism 25 adjacent the supply reel assembly 30, and the other guide mechanism 26 adjacent the takeup reel assembly 70. The tape guide mechanisms 25 and 26 coact to guide the magnetic tape between the two reel assemblies 30 and 70 along a predetermined path extending along the front side of the cassette assembly 20. Being different in construction, the two tape guide mechanisms 25 and 26 will be described one after the other.

Figure 14:
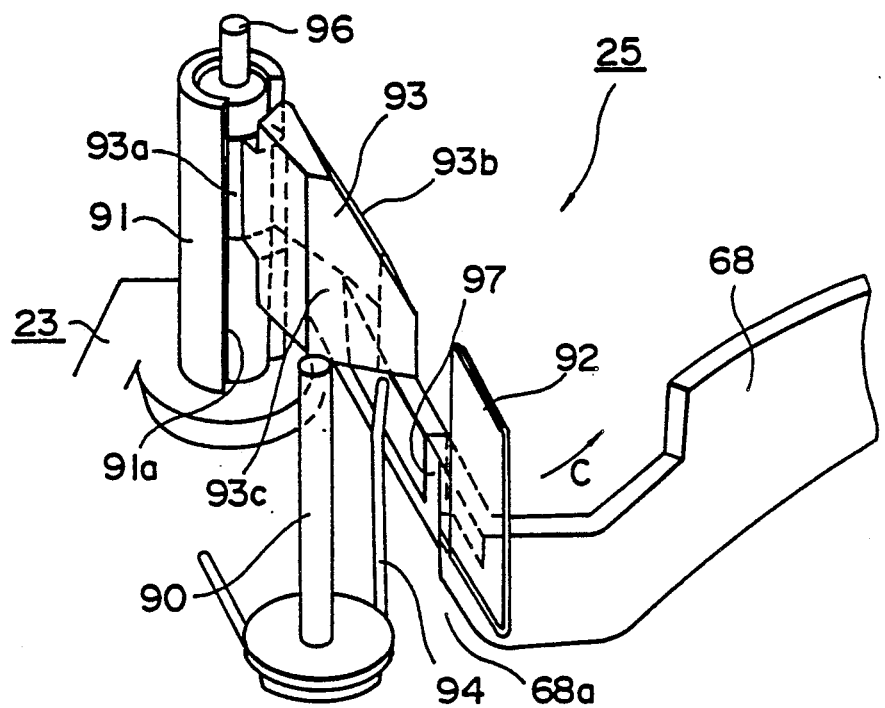
FIG. 14 is a perspective view of the supply-side tape guide mechanism included in the tape cassette.
Figure 15:
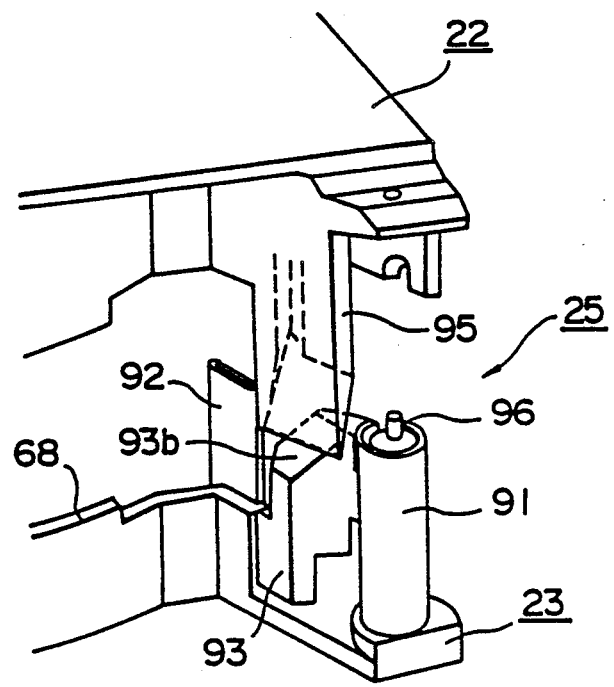
FIG. 15 is also a perspective view of the supply-side tape guide mechanism, shown in the state when the tape cassette is closed.

FIGS. 14 and 15 are detailed illustrations of the supply-side tape guide mechanism 25. It includes a guide pole 90 and a tape guide 91 of cylindrical shape, both erected on the bottom cassette section 23 and extending parallel to the reel axes. The tape guide 91 is disposed closer to the front edge, shown directed to the left in FIG. 14, of the bottom cassette section 23.

Disposed opposite the guide pole 90 is a pressure pad 92 for holding the magnetic tape against the guide pole. The pressure pad 92 is carried by a pad carrier 93. This pad carrier is proximally pivoted via a sleeve 93a on an upstanding pivot pin 96 coaxial with the tape guide 91. The pressure pad 92 is mounted to the distal end of the pad carrier 93 via a flexible member 97. A pad spring 94 acts on the midpart of the pad carrier 93 for biasing the pressure pad 92 in the direction of the arrow C, FIG. 14, or away from the guide pole 90.

The sleeve 93a on the proximal end of the pad carrier 93 is surrounded in part by the tape guide 91, which is tubular in shape with a slot 91a cut longitudinally therein. The pad carrier 93 extends through the slot 91a in the tape guide 91. The slotted tape guide 91 serves the additional purpose of limiting the angular displacement of the pad carrier 93 about the pivot pin 96.

The supply-side tape guide mechanism 25 further includes an actuating member 95, FIG. 15, depending from the top cassette section 22. The actuating member 95 comes into sliding engagement with the slanting surface 93b of the pad carrier 93 when the top cassette section 22 is closed against the bottom cassette section 23 as shown in FIG. 15. Sliding over the slanting surface 93b, the actuating member 95 causes the pad carrier 93 to pivot against the bias of the pad spring 94. Thus the pressure pad 92 becomes held against the guide pole 90 for engaging the magnetic tape therebetween.

Figure 16A:
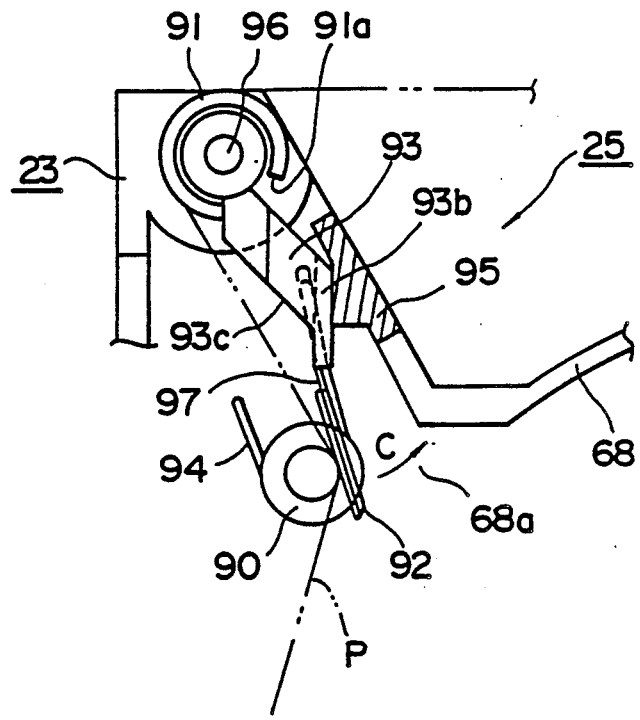
FIGS. 16A and 16B are both plan views explanatory of the operation of the supply-side tape guide mechanism.

A consideration of FIGS. 14 and 16A will reveal that the pad carrier 93 has a guide surface 93c which, as seen in a plan view as in FIG. 16A, extends at an angle to the tape path P between guide pole 90 and tape guide 91. This guide surface 93c serves to guide the tag TT of the magnetic tape T from guide pole 90 to tape guide 91 in initially threading the tape through the cassette assembly 20.

Such being the construction of the supply-side tape guide mechanism 25, the pad carrier 93 is pivoted clockwise, as shown in FIG. 16A, against the force of the pad spring 94 upon closure of the top cassette section 22 against the bottom cassette section 23. The pressure pad 92 on the pad carrier 93 is thus urged against the guide pole 90 to frictionally engage the magnetic tape T therebetween. The tape is thus prevented from slackening or being unwound from the supply reel assembly 30.

Figure 16B:
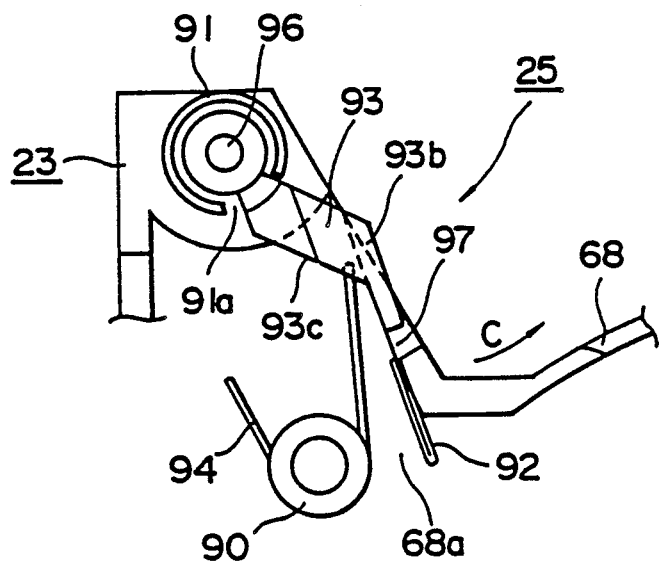

When the cassette assembly 20 is open, on the other hand, the pad carrier 93 is not acted upon by the actuating member 95. Accordingly, pivoted in the direction of the arrow C under the force of the pad spring 94, the pad carrier 93 moves the pressure pad 92 away from the guide pole 90, as illustrated in FIG. 16B. The magnetic tape T may therefore be easily threaded between guide pole 90 and pressure pad 92 on being unwound from the supply reel assembly 30.

Figure 17A:
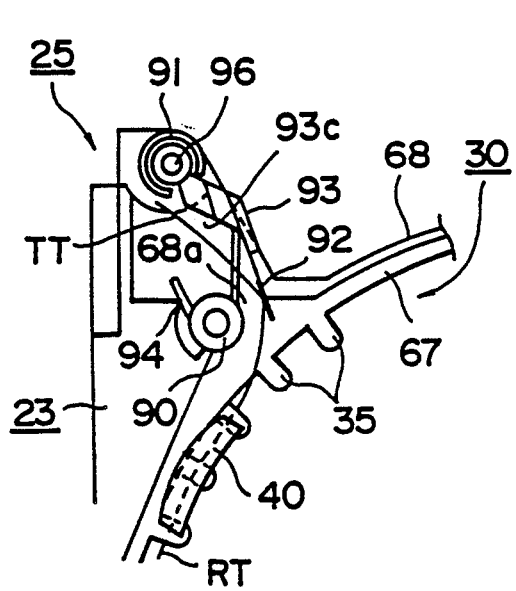
FIGS. 17A, 17B and 17C are a series of plan views explanatory of how the magnetic tape with the tape anchor thereon is threaded through the supply-side tape guide mechanism.
Figure 17B:
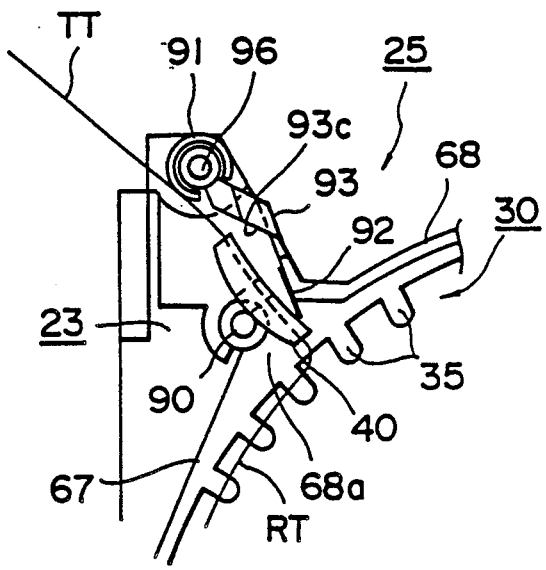
Figure 17C:
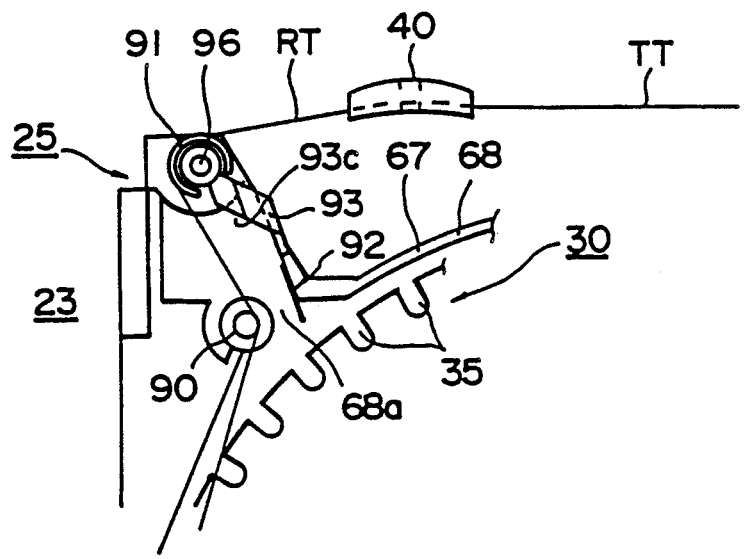

FIGS. 17A-17C are explanatory of the way in which the magnetic tape attached at its leader RT to the tape anchor 40 by removable means and is threaded past the supply-side tape guide mechanism 25. It will be noted from these drawings that the pressure pad 92 slightly intrudes into the supply reel chamber 67 through a tape passageway 68a formed in the circular wall 68 defining the chamber 67. Disposed opposite the pressure pad 92, the guide pole 90 lies contiguous to the tape passageway 68a. Furthermore, except for the tape passageway 68a, the circular wall 68 provides a smooth, unbroken surface around the supply reel assembly 30 mounted in the chamber 67. It may also be recalled that the magnetic tape tag TT is semipermanently curled radially outwardly of the supply reel assembly 30. All these facts combine to enable the tape tag TT to be smoothly guided into the space between guide pole 90 and pressure pad 92 through the following process:

Let us suppose that the supply reel assembly 30 has just been deposited in the supply reel chamber 67, with the tape anchor 40 either engaged with, or disengaged from, the top reel flange 32. The supply reel assembly 30 may then be manually revolved clockwise as viewed in FIGS. 17A-17C. The outwardly curling end of the tape tag TT will slide over the circular wall 68 to the tape passageway 68a. Then, hitting the pressure pad 92 which is now held sprung away from the guide pole 90, the tape tag TT will be guided into the space therebetween, as illustrated in FIG. 17A.

With the continued revolution of the supply reel assembly 30, the tape tag TT will travel past the tape guide 91 by being guided by the guide surface 93c of the pad carrier 93. FIG. 17B shows the tape tag TT thus guided out of the cassette assembly 20.

Then, as illustrated in FIG. 17C, a required length of the magnetic tape may now be unwound from the supply reel assembly 30 by holding the tag TT by fingertips and exerting a pull thereon. If the tape anchor 40 has been engaged with the top reel flange 32, it will be disengaged therefrom upon exertion of the pull on the magnetic tape. The unwound length of the magnetic tape may be manipulated from the supply-side tape guide mechanism 2 toward the takeup-side tape guide mechanism 26.

It is now clear that the supply-side tape guide mechanism 25 is well calculated for the ease of threading the tape along the predefined path between guide pole 90 and pressure pad 92 and past the tape guide 91. All that is necessary for threading the tape is to revolve the supply reel assembly 30 in the chamber 67 within the cassette assembly 20 and, after the tape tag has come out past the tape guide 91, to pull it out toward the takeup-side tape guide mechanism 26. It is even unnecessary to disengage the tape anchor 40 from the top reel flange 32 before threading the tape.

It will also be appreciated that the pad carrier 93 is sleeved upon the pin 96 for pivotal displacement about the axis of the tape guide 91. No space is therefore required exclusively for supporting the pad carrier 93. The resulting reduction in the space requirement of the supply-side tape guide mechanism 25 has made it possible to provide a tape path of sufficient width for the passage of the tape anchor 40.

Takeup-Side Tape Guide Mechanism

Reference may be made to FIGS. 18A and 18B and FIGS. 19A and 19B for the following detailed discussion of the takeup-side tape guide mechanism 26.

Included in the takeup-side tape guide mechanism 26 is a tape guide 100 erected on the bottom cassette section 23. A guide roller 101 is rotatably mounted to an upstanding shaft 103 erected on a carriage 102 of sectorial shape. The guide roller carriage 102 is formed in one piece with a sleeve 105 slidably fitted on another upstanding shaft 104. Guided by an arcuate guide groove 23a in the bottom cassette section 23, the guide roller carriage 102 is pivotable about the shaft 104 for moving the guide roller 101 toward and away the fixed tape guide 100 between the positions of FIGS. 19A and 19B. It will be observed from FIG. 19B that the guide roller 101 is somewhat spaced from the tape guide 100 even when moved toward the same.

A torsion spring 106, coiled around the shaft 104, urges the guide roller carriage 102 in the direction of the arrow D, that is, away from the tape guide 100. A collar 109 on the shaft 104 retains the sleeve 105 and spring 106 in position on the shaft.

The guide roller carriage 102 is also formed in one piece with an abutment 107 having a sloping surface 107a. Depending from the top cassette section 22, an actuating member 108 has a sloping edge 108a for sliding engagement with the sloping surface 107a of the abutment 107 when the top cassette section is closed against the bottom cassette section 23. The guide roller carriage 102 is then turned from its FIG. 19A position to that of FIG. 19B.

Figure 18A:
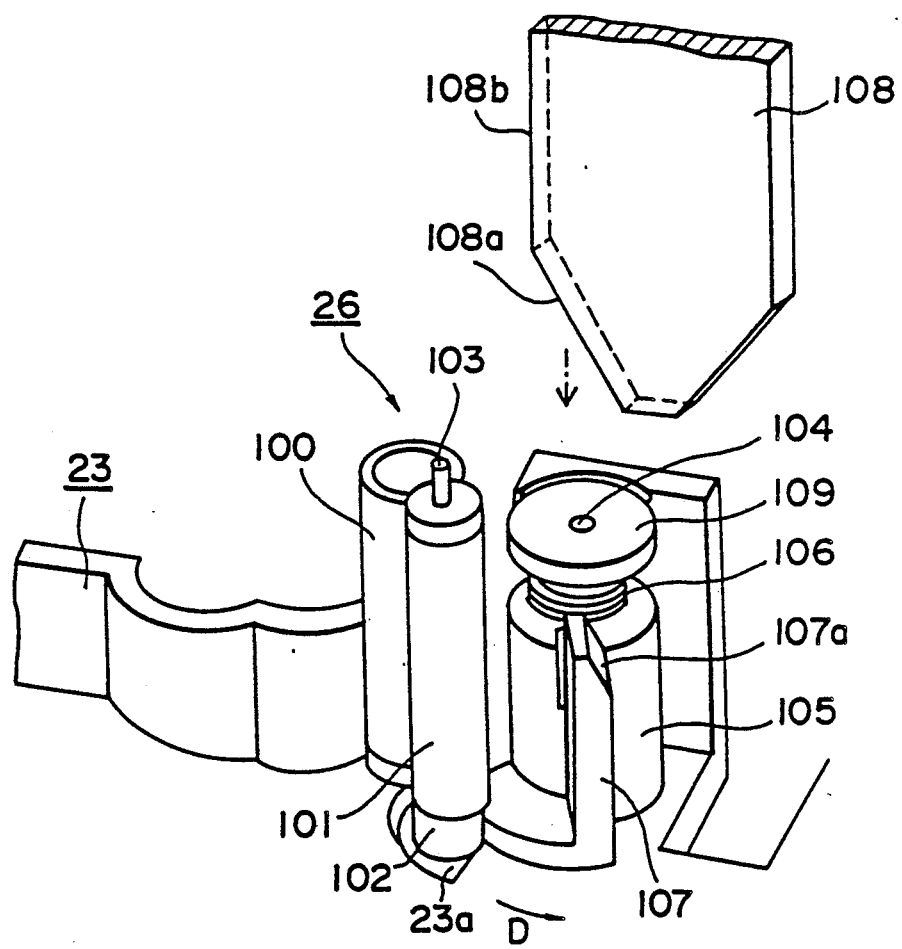
FIG. 18A is a perspective view of the takeup-side tape guide mechanism included in the tape cassette, the tape guide mechanism being shown in the state when the tape cassette is open.
Figure 19A:
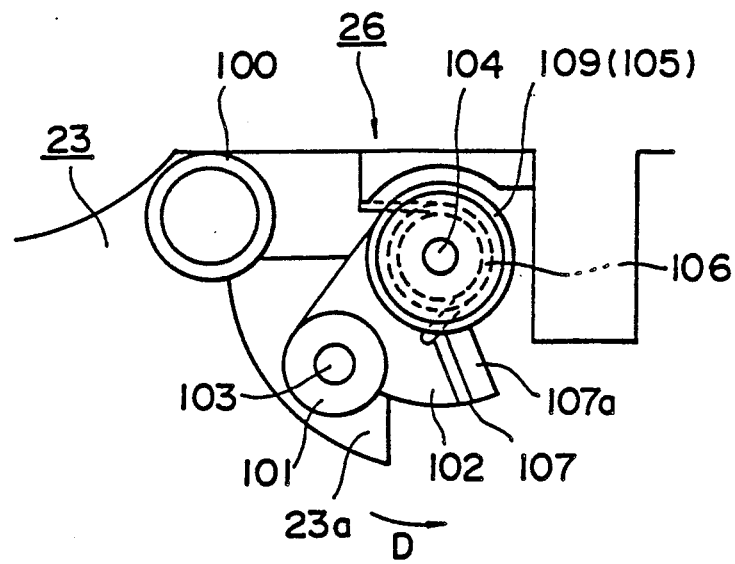
FIGS. 19A and 19B are both plan views explanatory of the operation of the takeup-side tape guide mechanism.

In the takeup-side tape guide mechanism 26 of the foregoing construction, the guide roller 101 is held spaced a relatively long distance from the tape guide 100 by the torsion spring 106 when the cassette assembly 20 is open. Both FIGS. 18A and 19A show the takeup-side tape guide mechanism 26 in this state. Unwound from the supply reel assembly and threaded through the supply-side tape guide mechanism 25 as set forth above, the magnetic tape can be readily manipulated through the wide spacing between tape guide 100 and guide roller 101.

The actuating member 108 will come into sliding engagement with the abutment 107 upon closure of the cassette assembly 20. The guide roller carriage 102 will then turn clockwise from its FIGS. 18A and 19A position to that of FIGS. 18B and 19B. The guide roller 101 will then move closer to the tape guide 100 to take up the slack of the magnetic tape T.

Figure 20:
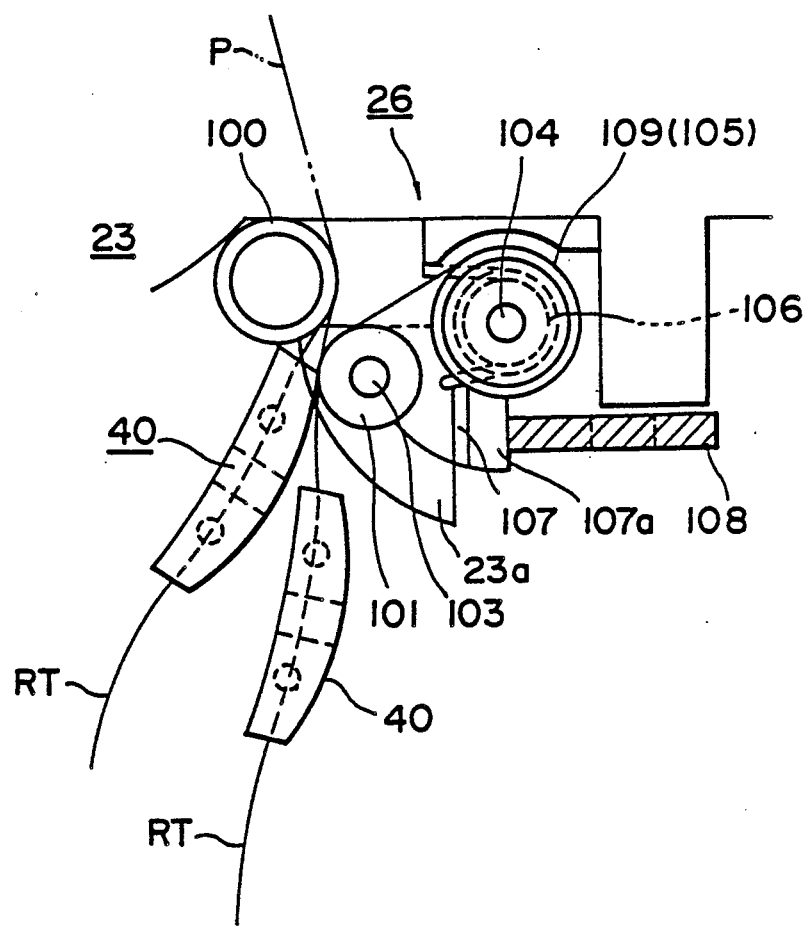
FIG. 20 is also a plan view explanatory of the operation of the takeup-side tape guide mechanism.

As better illustrated in FIG. 20, the thus-reduced spacing between tape guide 100 and guide roller 101 is less than the thickness of the tape anchor 40. Consequently, even if accidentally disengaged from the takeup reel assembly 70 during tape rewinding at high speed, the tape anchor 40 will be caught between these tape guide members. Thus the takeup-side tape guide mechanism 26 precludes the danger of destroying the magnetic head assembly or other parts of the VTR by the disengaged tape anchor.

Figure 18B:
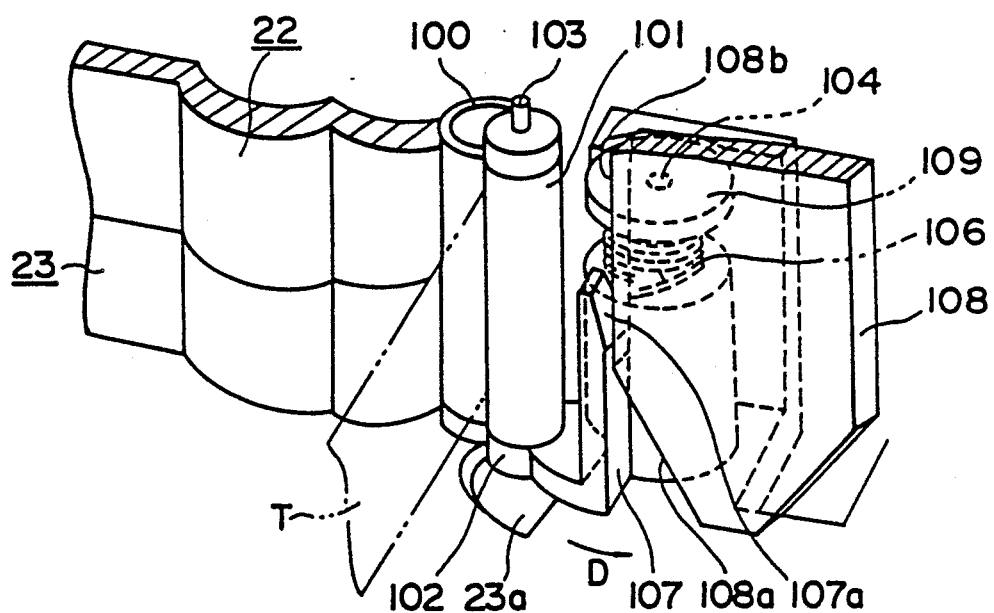
FIG. 18B is a view similar to FIG. 18A except that the takeup-side guide mechanism is shown in the state when the tape cassette is closed.

Usually, the tape is rewound at such high speed that the disengaged tape anchor 40 may strike the tape guide 100 and guide roller 101 with considerable momentum. However, the displaceable guide roller 101 will not yield to such momentum as its displacement is prevented by the actuating member 108 which has then its side edge 108b held against the abutment 107, as best shown in FIG. 18B. Of course, some alternative means might be provided solely for the prevention of troubles that may arise upon accidental disengagement of the tape anchor from the takeup reel assembly.

Front Cover Retractor Mechanism

Figure 21A:
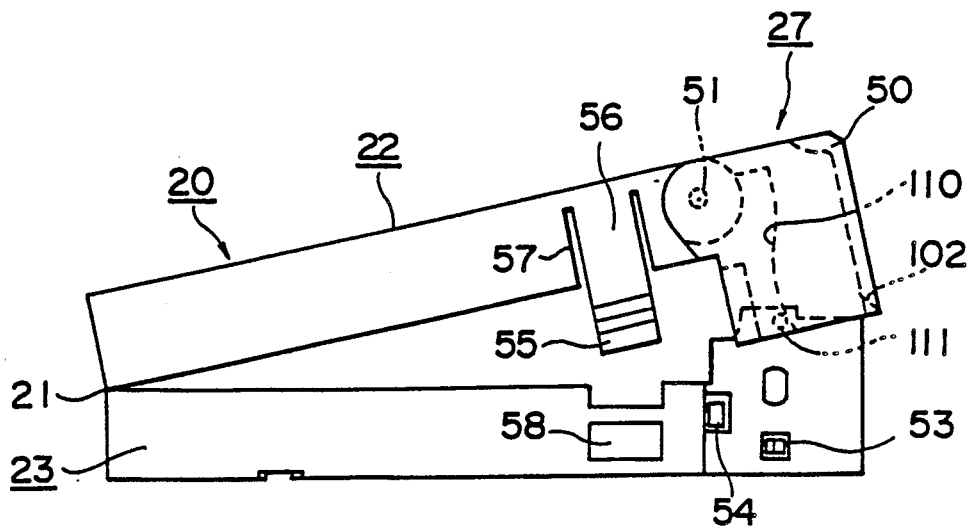
FIGS. 21A, 21B and 21C are a series of side elevations explanatory of the operation of the front-cover retractor mechanism included in the tape cassette.
Figure 21B:
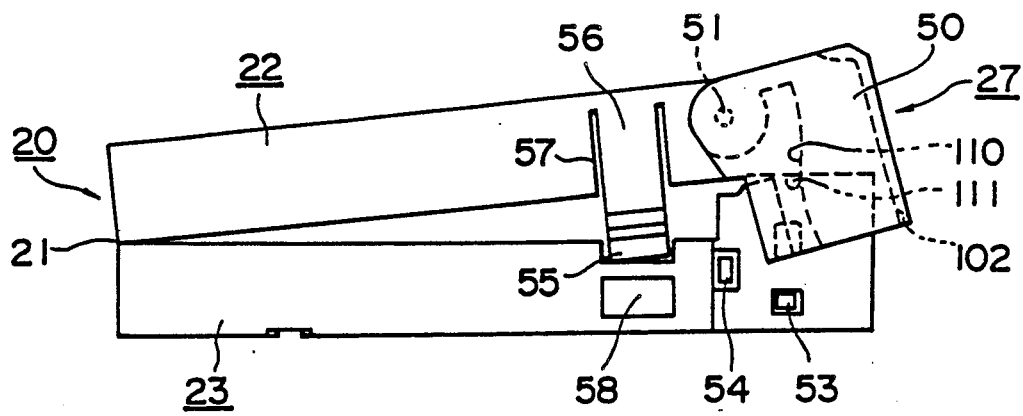

As illustrated in FIGS. 21A-21B, the front-cover retractor mechanism 27 has a cam groove 110, approximately in the shape of a recumbent T, formed on the inside of one side wall of the front cover 50. The bottom cassette section 23 has a projection 111 on the outside of one side wall thereof for sliding engagement in the cam groove 110 when the cassette assembly 20 is opened and closed.

The cam groove 110 is so contoured that, relatively sliding over the cam surface when the top cassette section 22 is being closed against the bottom cassette section 23, the projection 111 causes the front cover 50 to open slightly, as shown in FIG. 21B. The front cover 50 is opened only to such an extent as to avoid crashing down the magnetic tape in the case where the cassette assembly 20 is closed with the tape held somewhat slack as it extends between the two reel assemblies.

Figure 21C:
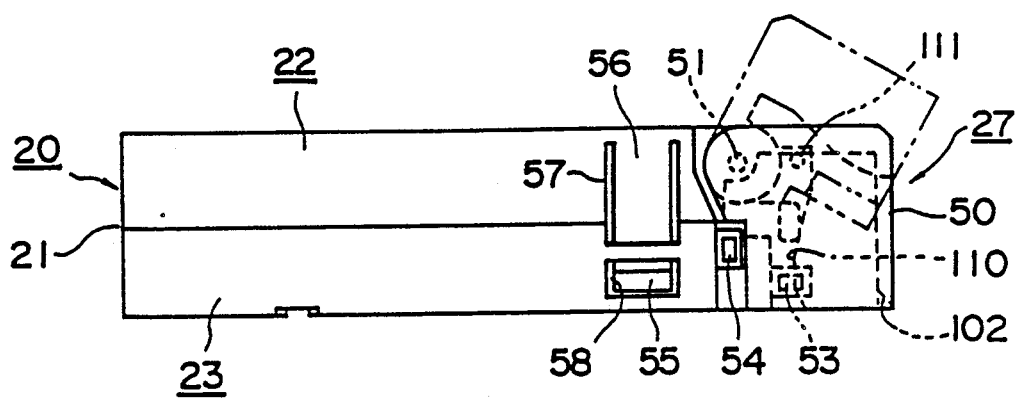

Also, the contour of the cam groove 110 is such that the front cover 50 is closed upon complete closure of the cassette assembly 20. It will be noted from FIG. 21C that the retractor mechanism 27 permits the front cover 50 to be fully opened or fully closed as required when the cassette assembly 20 is completely closed.

Preferably, and as indicated at 102 in FIGS. 21A and 21B, the bottom edge of the front cover 50 may be chamfered. The chamfer 102 will serve to push the loose tape toward the inside of the cassette assembly 20 in event the front cover 50 has come into contact with the tape during the closure of the cassette assembly.

Thus, despite the simplicity of its construction, the front-cover retractor mechanism 27 effectively prevents the pivoted front cover 50 from ruining the magnetic tape.

Loading of Supply Reel Assembly in Cassette Assembly

The cassette assembly 20 is readily openable for loading the supply reel assembly 30 therein. The top cassette section 22 may be turned away from the bottom cassette section 23 while the pair of hooks 55 of the latches 56 are being pushed into the apertures 58 in the opposite side walls of the bottom cassette section 23.

With the cassette assembly 20 thus opened, the reel-locking mechanism 24 is in the state of FIG. 13B. Since the abutment 80 on the top cassette section 22 moved out of abutting engagement with the tripping spring 88, the tripping levers 87 have retracted the reel detents 82 away from the positions of locking engagement with the reel assemblies 30 and 70 against the forces of the detent springs 84.

The supply-side tape guide mechanism 25 is in the state of FIG. 16B. Since the actuating member 95, FIG. 15, on the top cassette section 22 is now out of engagement with the pad carrier 93, the pressure pad 92 is held away from the guide pole 90 by the pad spring 94. In this retracted position the pressure pad 92 extends inwardly of the wall 68 through the tape passageway 68a formed therein.

The takeup-side tape guide mechanism 26 is in the state of FIGS. 18A and 19A. With the actuating member 108 on the top cassette section 22 moved out of engagement with the abutment 107, the guide roller carriage 102 has moved the guide roller 101 away from the tape guide 100.

The supply reel assembly 30 may now be placed in the correct attitude of FIG. 1 in the supply reel chamber 67, FIG. 4, within the bottom cassette section 23. The tape anchor 40 may be either left engaged with the supply reel assembly 30 or may be disengaged therefrom. The supply reel assembly 30 will be readily positioned in the chamber 67 as the reel detent 82 of the reel-locking mechanism 24 has been retracted away from the reel chamber 67.

Then the supply reel assembly 30 may be manually turned clockwise, as viewed in FIGS. 4 and 5, in the reel chamber 67. The tape tag TT will slide over the annular wall 68 of the reel chamber 67 with such manual turn of the supply reel assembly 30, until it comes to butt on the pressure pad 92 intruding into the reel chamber 67 through the aperture 68a, as shown in FIG. 17A. With the continued revolution of the supply reel assembly 30 the tape tag TT will travel through the spacing between guide pole 90 and pressure pad 92 and, guided by the guide surface 93c of the pad carrier 93, project out of the cassette assembly 20 as in FIG. 17B.

Then, with a pull on the tape tag TT, the magnetic tape may be unwound from the supply reel assembly 30 to an extent for anchoring the tape to the takeup reel assembly 70. Then the tape may be threaded between the tape guide 100 and guide roller 101 of the takeup-side tape guide mechanism 26 toward the takeup reel assembly 70. This threading of the tape through the takeup-side tape guide mechanism 26 will be easy because the tape guide 100 and guide roller 101 are now widely spaced from each other as shown in FIG. 19A.

Figure 10:
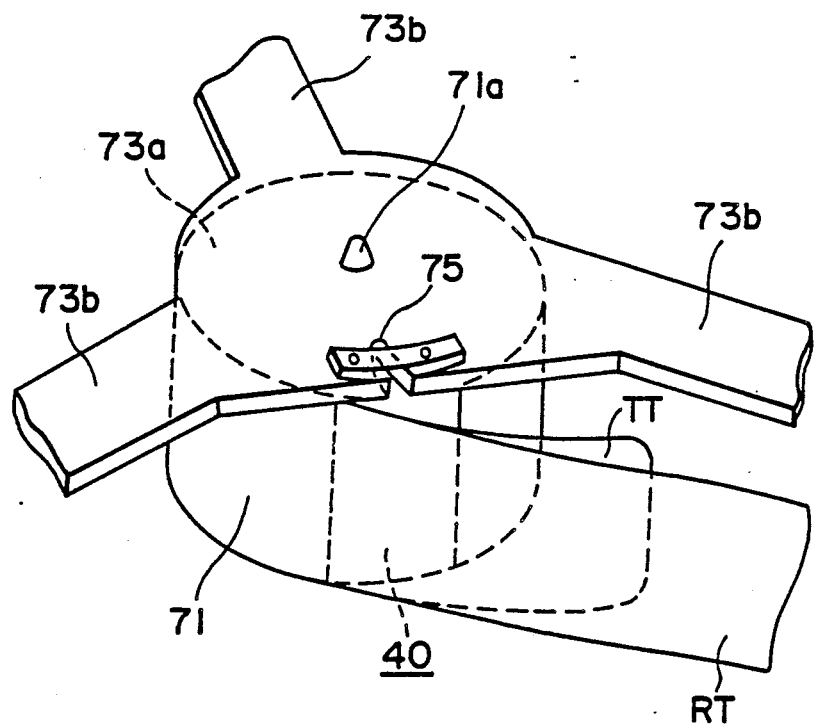
FIG. 10 is a view somewhat similar to FIG. 9 except that the tape anchor is shown engaged with the takeup reel assembly.

Next comes the step of anchoring the magnetic tape to the takeup reel assembly 70. As has been mentioned in connection with FIGS. 9 and 10, the fastener portion 42 of the tape anchor 40 may be slid along the periphery of the flange hub 73a of the takeup reel assembly 70 into engagement in the notch 75. The body portion 41 of the tape anchor will then be engaged in the recess 74 in the reel hub 71. Now the magnetic tape has been anchored to the takeup reel assembly 70 after having been unwound from the loaded supply reel assembly 30 and threaded through the tape guide mechanisms 25 and 26.

The anchorage of the magnetic tape to the takeup reel assembly 70 will be easy for several reasons. One of these is that, being unlocked from one of the pair of reel detents 82, FIG. 12, the takeup reel assembly 70 is free to be revolved to any desired angular position in the reel chamber 69. The second reason is that, as illustrated in FIG. 9, the top flange 73 of the takeup reel assembly 70 is comprised of the flange hub 73a of a minimal diameter and a minimal number of spokes 73b extending radially therefrom. The tape anchor 40 can therefore be easily manipulated into engagement with the takeup reel assembly 70 through the spaces between the spokes 73b. Finally, the tape anchor 40 has the neck 42a at its top end only, for engagement with the top flange hub 73a, so that the tape anchor can be mounted to the takeup reel assembly far more easily than if such necks were formed at both ends of its body portion 41 for engagement with both reel flanges.

Following the anchorage of the magnetic tape to the takeup reel assembly 70, this reel assembly may be manually revolved clockwise, as viewed in FIG. 4, in order to take up the slack of the tape that may have developed during the foregoing process of tape threading and anchoring.

Then the top cassette section 22 may be closed against the bottom cassette section 23. Possibly, the tape may still have some slight slack as it extends along the front of the cassette assembly 20. Despite such possible slight slack, however, the front cover 50 will not engage the tape during the closure of the top cassette section 22 by being pivoted away from the front of the bottom cassette section 23 by the front-cover retractor mechanism 27.

Figure 19B:
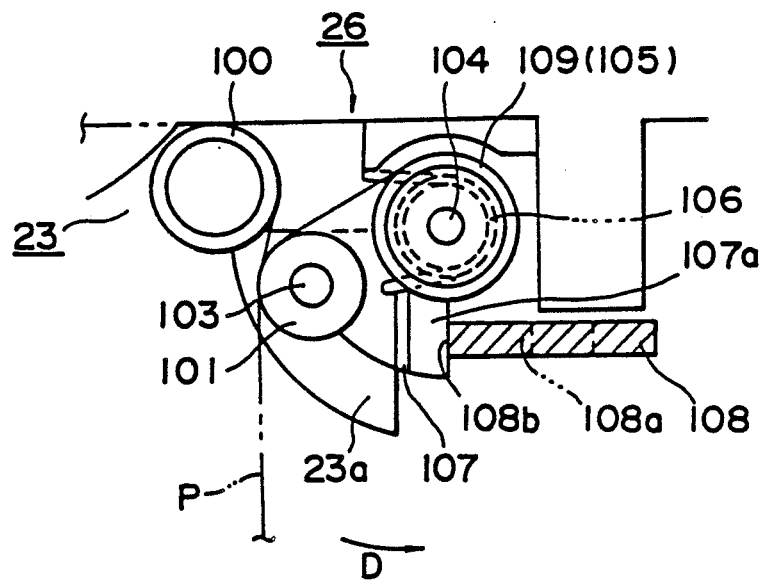

Upon closure of the cassette assembly 20 the pair of reel detents 82 of the reel-locking mechanism 24 will be actuated into locking engagement with both reel assemblies 30 and 70, as has been described with reference to FIG. 13A. The pressure pad of the supply-side tape guide mechanism 25 will also be actuated to press the magnetic tape against the guide pole 90 as in FIG. 16A. Furthermore the guide roll 101 of the takeup-side tape guide mechanism 26 will be moved closer to the tape guide 100, as shown in FIGS. 18B and 19B, thereby taking up the tape slack.

The loading of the removable supply reel assembly 30 in the cassette assembly 20 has now been completed. The magnetic tape extends between supply reel assembly 30 and takeup reel assembly 70 along the predetermined path without little or no slack.

Despite the preceding detailed disclosure it is not desired that the invention is limited by the exact details of the illustrated embodiments. A variety of modifications or alterations may be adopted in the practice of the invention to conform to specific requirements of each application of the invention or to design preferences, without departing from the scope of the invention.

I claim:

1. A removable tape reel assembly system for a magnetic tape cassette, comprising:
   a cassette assembly comprising a top section and a bottom section hinged together;
   a first tape reel assembly rotatably and removably mounted in said bottom section comprising,
   a first reel hub to which one end portion of the tape is to be anchored and around which the tape is to be coiled, said first reel hub having opposite ends,
   a pair of spaced first reel flanges on said opposite ends of said first reel hub, and
   a first engaging means defined in a periphery of at least one of said first reel flanges;
   a second tape reel assembly rotatably mounted in said bottom section comprising,
   a second reel hub onto which a part of the tape is to be coiled, said second reel hub having opposite ends,
   a pair of spaced second reel flanges on said opposite ends of said second reel hub, and
   a second engaging means in said second reel hub; and a tape anchor comprising,
   a body portion for retaining another end portion of the tape between said reel flanges of said pairs, and
   a fastener portion joined to said body portion and engageable selectively with said first engaging means of said at least one of said first reel flanges and with said second engaging means of said second reel hub;
   so that said another end of the tape coiled around said first reel hub is prevented from loosening when said fastener portion of said tape anchor is engaged with said first engaging means and is connected to said second reel hub between said second reel flanges when said fastener portion of said tape anchor is engaged with said second engaging means of said second reel hub.

2. The tape reel assembly system as claimed in claim 1 wherein:
   said first engaging means comprises first notch means in at least one of said first reel flanges; and
   said second engaging means comprises second notch means.

3. The tape reel assembly system as claimed in claim 2 wherein:
   said first notch means comprises a plurality of substantially equally spaced first notches.

4. The tape reel assembly as claimed in claim 3 wherein said fastener portion of said tape anchor comprises:
   a neck releasably engageable selectively in one of said first notches and said second notch means; and
   a head portion joined to said body portion by said neck.

5. The tape reel assembly as claimed in claim 4 and further comprising:
   at least one depression in said second reel hub releasably engageable with said at least one projection on said head portion of said tape anchor when said neck is engaged in said second notch means.

6. The tape reel assembly as claimed in claim 3 wherein:
   said fastener portion of the tape anchor comprises a pair of necks releasably engageable in any two notches in one of said first reel flanges and a head joined to the body portion via the neck; and
   said second notch means comprises a plurality of second notches spaced to receive said pair of necks.

7. The tape reel assembly as claimed in claim 2 wherein said second engaging means further comprises a recess for receiving said tape anchor therein.

8. The tape reel assembly as claimed in claim 2 wherein said fastener portion of said tape anchor comprises:
   a neck releasably engageable selectively in one of said first and second notch means; and
   a head portion joined to said body portion by said neck.

9. The tape reel assembly as claimed in claim 8 and further comprising:
   groove means extending along said periphery of said at least one of said first reel flanges; and
   at least one projection on said head portion releasably engageable in said groove means when said neck is engaged in said first notch means.

10. The tape reel assembly as claimed in claim 9 and further comprising:
    at least one depression in said second reel hub releasably engageable with said at least one projection on said head portion of said tape anchor when said neck is engaged in said second notch means.

11. The tape reel assembly as claimed in claim 1 wherein said second engaging means comprises a recess for receiving said tape anchor therein.

* * * * *